No. 838,981. PATENTED DEC. 18, 1906.
J. K. GRIFFITH.
MANUFACTURE OF CAR WHEELS.
APPLICATION FILED JULY 12, 1904.

3 SHEETS—SHEET 1.

WITNESSES

INVENTOR
J. K. Griffith
by Bakewell & Byrnes
his Attorneys

No. 838,981. PATENTED DEC. 18, 1906.
J. K. GRIFFITH.
MANUFACTURE OF CAR WHEELS.
APPLICATION FILED JULY 12, 1904.

3 SHEETS—SHEET 2.

WITNESSES

INVENTOR
J. K. Griffith
by Bakewell Byrnes
his Attorneys

No. 838,981. PATENTED DEC. 18, 1906.
J. K. GRIFFITH.
MANUFACTURE OF CAR WHEELS.
APPLICATION FILED JULY 12, 1904.
3 SHEETS—SHEET 3.
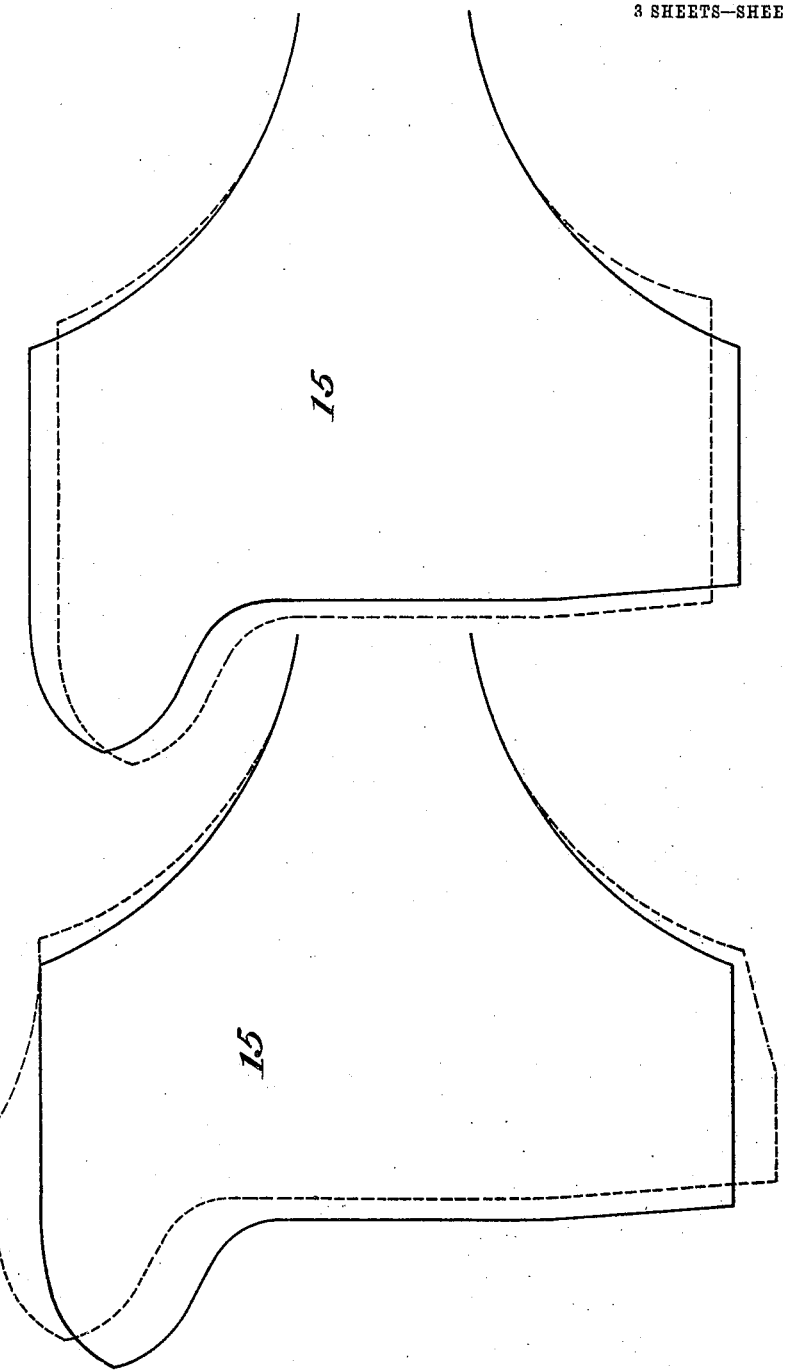

UNITED STATES PATENT OFFICE.

JACOB K. GRIFFITH, OF LATROBE, PENNSYLVANIA.

MANUFACTURE OF CAR-WHEELS.

No. 838,981.  Specification of Letters Patent.  Patented Dec. 18, 1906.

Application filed July 12, 1904. Serial No. 216,214.

*To all whom it may concern:*

Be it known that I, JACOB K. GRIFFITH, of Latrobe, Westmoreland county, Pennsylvania, have invented a new and useful Improvement in the Manufacture of Car-Wheels, of which the following is a full, clear, and exact description, reference being had to the accompanying drawings, forming part of this specification, in which—

Figure 1:
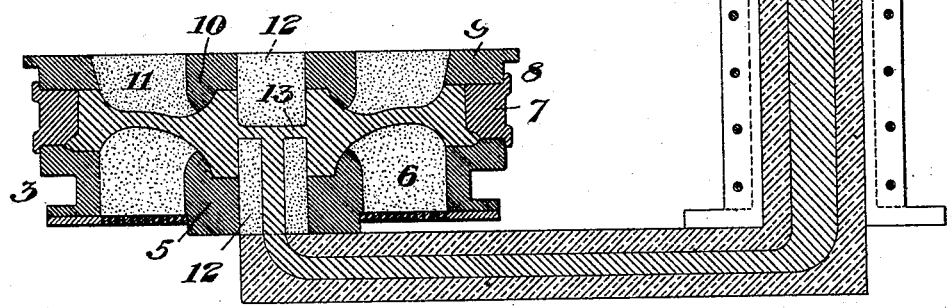
Figure 2:
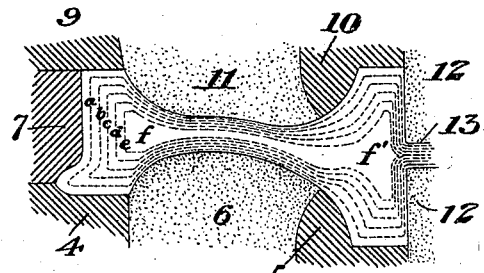
Figure 3:
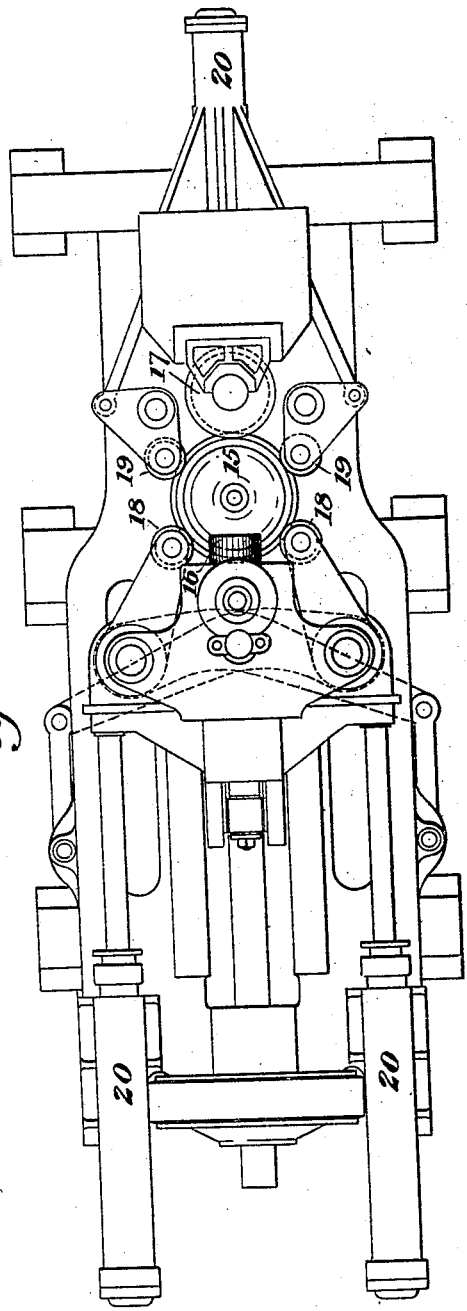
Figure 4:
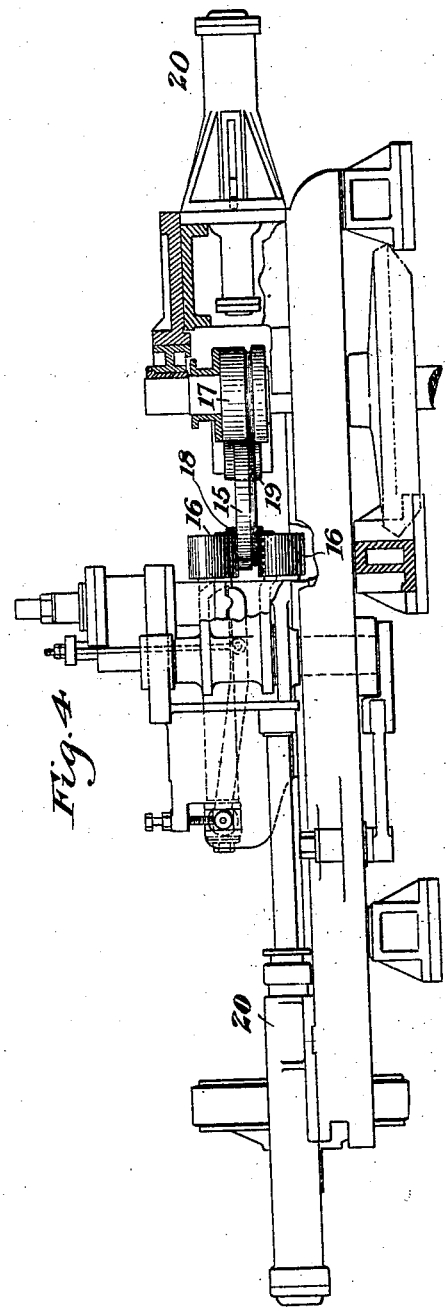

Figure 1 shows in vertical section a mold with its contained casting, illustrating the first step of my method of making car-wheels. Fig. 2 is a diagrammatic view on a larger scale. Fig. 3 is a plan view of a wheel rolling-mill, illustrating the second step. Fig. 4 is a side elevation of Fig. 3, partly in section; and Figs. 5 and 6 are diagram views illustrating the final step of my method.

In the manufacture of car-wheels in accordance with my method the first step of the method consists, preferably, in casting the wheel in such manner as to produce a wheel substantially free from shrinkage-cavities and solidified by the act of casting. I then take such wheel and subject it to a rolling operation in which it is compressed successively on the tread and on the edge, first being compressed on the tread and then on the edge, or vice versa, each compression causing a reduction of the metal of the rim in the direction in which the compression is applied and a thickening of the metal of the rim in a direction at right angles thereto without substantially affecting the web. Thus if the compression is first applied to the tread it will spread the metal of the wheel edgewise at its rim, reducing the wheel somewhat in diameter—say to the extent of five-sixteenths of an inch, if its original diameter was thirty-three and three-sixteenths inches—and increasing its width at the rim from, say, five and thirteen thirty-seconds inches to six and one-eighth inches. At the next operation, the wheel being rolled edgewise at the rim, it is restored substantially to its original dimensions; but the effect is to roll-refine the metal of the rim, breaking up the coarse granular or crystalline structure into a fine grain, which increases the tensile strength, renders the metal solid and homogeneous, and greatly improves the quality of the wheel.

If desired, the second step of the method may be carried on independently of the first step—that is to say, the method of rolling may be applied to wheels which are cast otherwise than as above described.

In Fig. 1 of the drawings, in which I show apparatus well adapted for the practice of my invention, 2 is the head-box of a runner through which the molten metal is supplied to the casting. 3 is the drag, composed of an outer chill 4, which is adapted to come in contact with and to chill the bottom face of the casting at its periphery, a central chill 5, which is in contact with the exterior of the hub portion of the wheel, and a portion 6, which is made of non-conducting material, such as sand, and is in contact with the thinner intermediate or web portion of the wheel. 7 is an intermediate cheek-plate, which is also a chill and which comes into contact with the periphery of the wheel. 8 is the cope, consisting of an outer chill 9, which is in contact with the top face of the periphery of the wheel, an inner chill 10, which is in contact with the top of the hub, and an intermediate portion 11 of non-conducting material, such as sand, in contact with the top of the web. 12 is the center core or hub-core, which is made of sand or like non-conducting material, and 13 is the gate which enters the mold-cavity at the middle of the core.

Instead of casting the wheel by bottom-casting from a central runner, as illustrated in the drawings, which enables me to cast several molds in a group at one operation, I may cast it from the top by pouring in a head-box or in any other approved manner. The gate 13, at which the metal enters the mold-cavity, should, however, be as near the center of the hub as possible, and I place it thus at the center when the core (or hole in the hub) is of sufficiently large diameter; but when the core is of too small diameter for this purpose I may form the gate at the end of the hub. It is desirable to fill the mold as quickly as possible, and in casting a thirty-three-inch car-wheel it has been my practice to fill the entire mold in about thirty seconds, so that the chilling of the surfaces of all parts of the wheel shall begin as nearly simultaneously as possible. The mold having been thus filled, the chilling of the metal commences at all parts of the casting at once and takes place substantially as indicated in diagram by the dotted lines *a b c d e* in Fig. 2. The portions of the casting in contact with the chills or metal portions of the mold solidify much more rapidly than the thinner web portion in contact with the sand bodies 6 and 11 and the portion in contact with the sand at the gate. I have found that steel in contact with such chills solidifies at the rate of about three-eighths of an inch per minute, and in contact with the sand it solidifies much more slowly.

The consequence of having chills at the ends and periphery of the rim of the wheel and the ends of the hub is that these portions solidify very quickly; but the web and inner sides of the hub being in contact with sand solidify much more slowly, so that when the wheel eventually has set to the line $e$ in Fig. 2 there are still liquid portions $ff'$ extending into the web and preferably throughout the web, and any shrinkage-cavities which occur will be found in these last-cooling portions $ff'$. The rapid contracting of the rim, however, acts upon these relatively small interior bodies of molten metal and subjects them to a strong compression exerted inwardly in the plane of the web, so that at the time when the metal at the gate 13 is solidified sufficiently to cut off the entrance of further molten metal to the casting this strong inward pressure of contraction, due to the natural cooling of the metal in the rim, will act on the still molten interior portions and will compress the same, so as to eliminate or greatly reduce the shrinkage-cavities. The chilling and setting of the metal at the outer sides of the hub offer resistance to the inward contraction of the rim. It will be noticed that the distance between the chill-surfaces at the hub of the wheel is greater than the thickness of the web between the hub and rim. The consequence is that the molten metal has free access to the web from the gate, whereas if the space between these chill-surfaces were contracted the metal would chill between them almost immediately after filling the mold and would thus cut off the web from access to the molten metal at the middle, producing a cavity and entailing evils which I avoid.

I have found in practice that when the gate 13 is of ordinary size the metal at that gate will solidify in about five minutes, at which time the admission of fluid metal to the casting will cease; but the cooling of the casting has then so far progressed that the interior unsolidified portions are small in volume, substantially as indicated in the drawings, and an efficient compression, as above described, will therefore take place. When the casting has sufficiently cooled to enable it to be removed, (say in about ten minutes after casting a car-wheel of ordinary size,) I remove it from the mold. It will then have contracted in diameter about one-eighth of an inch out of a total ultimate contraction of thirteen-sixteenths of an inch in a thirty-three-inch wheel. The casting is then preferably embedded in ashes, or other means are taken to cause it to cool more uniformly and slowly than if it were in the open air or were allowed to remain in the mold in contact with the chills.

My method of casting involves an operation wherein the steel wheel is chilled in the mold at its rim more rapidly than it is chilled in the web and at the interior of the rim, so that the fluid compression which results from the contraction of the periphery will be exerted inwardly in the plane of the web. It also preferably comprises an operation in which, in addition to the chilling of the periphery of the wheel as above described, the wheel is chilled at the hub beyond the inner end of the web and is caused to cool more rapidly at that portion of the hub than it cools in the web or at the portion of the hub where the runner enters. The rapid chilling of the metal at the inner side of the hub affords a resistance to the strong inward compression of the web transmitted from the contraction of the rim.

I take a steel wheel cast as above described and subject it alternately to a rolling and reducing operation on its tread and on the edge of its rim, by which I first bring the wheel from the original dimensions indicated by the dotted lines in Fig. 5 to the dimensions indicated by the full lines in that figure, and then by rolling it on the edge I restore the wheel to the original dimensions indicated by the dotted lines. As above stated, these operations may be reversed, as illustrated in Fig. 6.

The apparatus which I prefer to use for this purpose is shown in Figs. 3 and 4, in which 15 is the car-wheel being rolled; 16 is a pair of horizontal rolls adapted to operate upon the edge of the rim; 17 is a stationary roll adapted to engage the tread, and 18 and 19 are adjustable rolls for the same purpose adapted to apply pressure to the tread of the wheel by means of hydraulic cylinders or other pressing mechanism 20.

In the operation of the mill the wheel is first operated on by edging-rolls 16 and is next subjected to the action of the tread-rolling rolls 17, 18, and 19.

By the means above described the quality of the steel in the rim of the wheel is greatly improved without weakening or distorting the web.

I claim—

1. The method of making steel car-wheels which consists in solidifying the metal of the rim, during casting, while retaining the inner portion of the web fluid, thereby obtaining a rim without cavities, and then altering the molecular structure of the rim, while retaining substantially its original sectional area, by subjecting it to alternate reduction on its edges and on its tread; substantially as described.

2. The method of making steel car-wheels which consists in solidifying the metal of the rim, during casting, while retaining the inner portion of the web fluid, thereby obtaining a rim without cavities, and then altering the molecular structure of the rim by rolling it alternately on its edges and on its tread, and at each rolling operation reducing the thickness of the metal in the direction in which pressure is applied and increasing the thickness of the rim of the wheel in a direction at right angles to that of the applied pressure; substantially as described.

3. The method herein described of making car-wheels with integral wrought rims which consists in casting a blank of substantially the desired form, and then rolling the wheel-rim alternately on its tread and on its edges, and at each rolling operation reducing the thickness of the metal in the direction in which the pressure is applied and increasing the thickness of the wheel-rim in a direction at right angles to that of the applied pressure, while retaining substantially the original dimensions of the web; substantially as described.

In testimony whereof I have hereunto set my hand.

JACOB K. GRIFFITH.

Witnesses:
 THOMAS W. BAKEWELL,
 GEO. B. BLEMING.